United States Patent [19]
Sörgel

[11] Patent Number: 5,461,894
[45] Date of Patent: Oct. 31, 1995

[54] CONTROL SYSTEM FOR A HOT AND/OR COLD ROLLING PROCESS

[75] Inventor: Günter Sörgel, Nürnberg, Germany

[73] Assignee: Siemens Aktiengesellschaft, Munich, Germany

[21] Appl. No.: 107,725

[22] PCT Filed: Feb. 14, 1992

[86] PCT No.: PCT/DE92/00104

§ 371 Date: Aug. 20, 1993

§ 102(e) Date: Aug. 20, 1993

[87] PCT Pub. No.: WO92/14563

PCT Pub. Date: Sep. 3, 1992

[30] Foreign Application Priority Data

Feb. 20, 1991 [DE] Germany .......................... 41 05 321.4

[51] Int. Cl.⁶ ............................. B21B 37/00; G05B 13/04
[52] U.S. Cl. .................................. 72/8; 364/151; 364/472
[58] Field of Search ............................. 72/6, 8; 364/149, 364/151, 469, 472

[56] References Cited

U.S. PATENT DOCUMENTS

| | | | |
|---|---|---|---|
| 3,863,478 | 2/1975 | Harada et al. | 72/6 |
| 4,407,017 | 9/1983 | Zhilikov et al. | 364/149 |

FOREIGN PATENT DOCUMENTS

| | | |
|---|---|---|
| 3026229 | 2/1981 | Germany . |
| 4040360 | 6/1991 | Germany . |
| 0310402 | 12/1989 | Japan .................... 964/151 |

OTHER PUBLICATIONS

Iron and Steel Engineer, vol. 64, No. 10, Oct. 1987, Pittsburgh, U.S., pp. 45–49; W. Smith: *Modernization of a tandem cold mill with distributed digital control*.

International Federation of Automatic Control, proceedings of the IFAC, 6th World Congress; Boston, 24–30 Aug. 1975; Instrument Society of America, Pittsburgh, Pennsylvania, U.S., 1975; Part 2—Applications; Session 46.1, pp. 1–8; H. W. Seyfried et al.: *Application of adaptive control in rolling mill area, especially for plate mills*.

Primary Examiner—Lowell A. Larson
Assistant Examiner—Thomas C. Schoeffler
Attorney, Agent, or Firm—Kenyon & Kenyon

[57] ABSTRACT

A feedback control of a hot and/or cold rolling process by means of a process control system, which executes a predetermined rolling program containing the initial and final dimensions, material data, roll temperatures, etc., and has a master system for controlling the setpoint values of subordinate, preferably decoupled, individual control units for the variable functional variables of the individual roll stands, e.g. rolling force, rotational speed, screw-down position [setting], etc. The setpoint values of the control units are determined in a computational operation using model equations, in which prepared and statistically processed measured values of the process variables are substituted, with convergent adaptation of absolute parameters to the actual parameters. In the event of changes in the requirements of the rolling process, in particular in the event of a transition from manual to automatic operation, or of changes in the final thickness, and/or changes in temperature, a relative adaptation of the parameters is carried out on the basis of the set values used before the changes in requirements as initial values.

5 Claims, 2 Drawing Sheets

5,461,894

CONTROL SYSTEM FOR A HOT AND/OR COLD ROLLING PROCESS

BACKGROUND OF THE INVENTION

The present invention relates to a feedback control of a hot and/or cold rolling process by means of a process control system, which executes a predetermined rolling program containing the initial and final dimensions, material data, roll temperatures, etc., and has a master system for controlling the setpoint values of subordinate, preferably decoupled, individual control units for the variable functional variables of the individual roll stands, e.g. rolling force, rotational speed, screw-down position [setting], etc. The setpoint values of the control units are determined in a computational operation using model equations, in which prepared and statistically processed measured values of the process variables are substituted, with a converging absolute adaptation of parameters to the actual parameters.

Control systems for hot and/or cold rolling processes, which work with single closed-loop control circuits and parameter adaptation of the model equations to determine the setpoint values of the control units are generally known and are described, for example, in the non-prepublished German Patent Application 40 40 360.2. These types of control systems work most satisfactorily in continuously running rolling processes. What is disadvantageous, however, is that in the event that the requirements change, the time for achieving the new operating state is relatively long. This means that several strips, or the like, could possibly be rolled with faulty dimensions or incorrect temperatures before the new operating state is reached. The reason for this is that the known control system carries out the parameter adaptation with learning steps, i.e., step by step.

SUMMARY OF THE INVENTION

To overcome the disadvantages of the prior art, the present invention specifies a control system for hot and/or cold rolling processes, which in the event of changes in requirements leads very quickly to a product that is within tolerances, in particular to a product that can be utilized immediately after the requirement is changed.

This is done with surprising ease in that in the event of changes in the requirements of the rolling process, particularly in the transition from manual to automatic operation, or of changes in the final thickness, and/or changes in temperature, a relative adaptation of the control system is carried out whereby deviations between the measured values of the process variables and values coming from the preceding rolling process are calculated, based on said deviations set values are calculated with the aid of the model equations and the set point values are supplemented by the set values.

The relative adaptation of control system is achieved which makes it possible to reach the tolerance range for the finished product considerably faster than had previously been possible. This applies particularly to when a new dimension, a new quality or a new structural state is initially rolled in manual operation, or when the rolling program, as is customary, is conceived so as to allow successive roll lots to be staggered according to their differences.

The converging parameter adaptation takes place advantageously as the result of rapid comparisons of the following types. The absolute and relative converging parameter adaptation proceeds from an initial equation of the type:

$$r_{si} = S_i - h_i + C_{Ri} F_i$$

$$r_{fi} = -a_{Ri} h_{i-1} + a_{Ri} h_i + F_i,$$

where r represents the parameters.

The absolute and relative converging parameter adaptation is then continued with equations of the type:

$$\hat{r}_{Si} = \frac{1}{1 + sT_1} r_{Si}$$

$$\hat{r}_{fi} = \frac{1}{1 + sT_2} r_{fi}$$

$\hat{r}$ representing the corrected parameters.

Finally, the absolute and relative converging parameters adaptation is further continued with equations of the type:

$$\hat{r}_{si} = S_i - h_i^* + C_{Ri} F_i^*$$

$$\hat{r}_{fi} = -a_{Ri} h_{i-1} + a_{Ri} h_i^* + F_i^*,$$

so that the variable functional variables of the roll stands are determined from these equations.

With a small amount of computational work, a rapid convergence results in these equations, both for the absolute as well as for the relative adaptation. By using these equations simultaneously for both adaptation processes, it is possible to supplement the program used to carry out the adaptation in an advantageously simple manner.

As a processing unit, it is advantageous to use a Siemens computer system of the type known as the Simiero-SX. In addition to the execution of the controlling functions, inter alia, both the parameter adaptation as well as the setpoint-value calculation take place in this system.

BRIEF DESCRIPTION OF THE DRAWINGS

Other advantages and details are revealed in the subsequent description of an exemplified embodiment on the basis of the drawing and in conjunction with the dependent claims.

DETAILED DESCRIPTION

Figure 1:
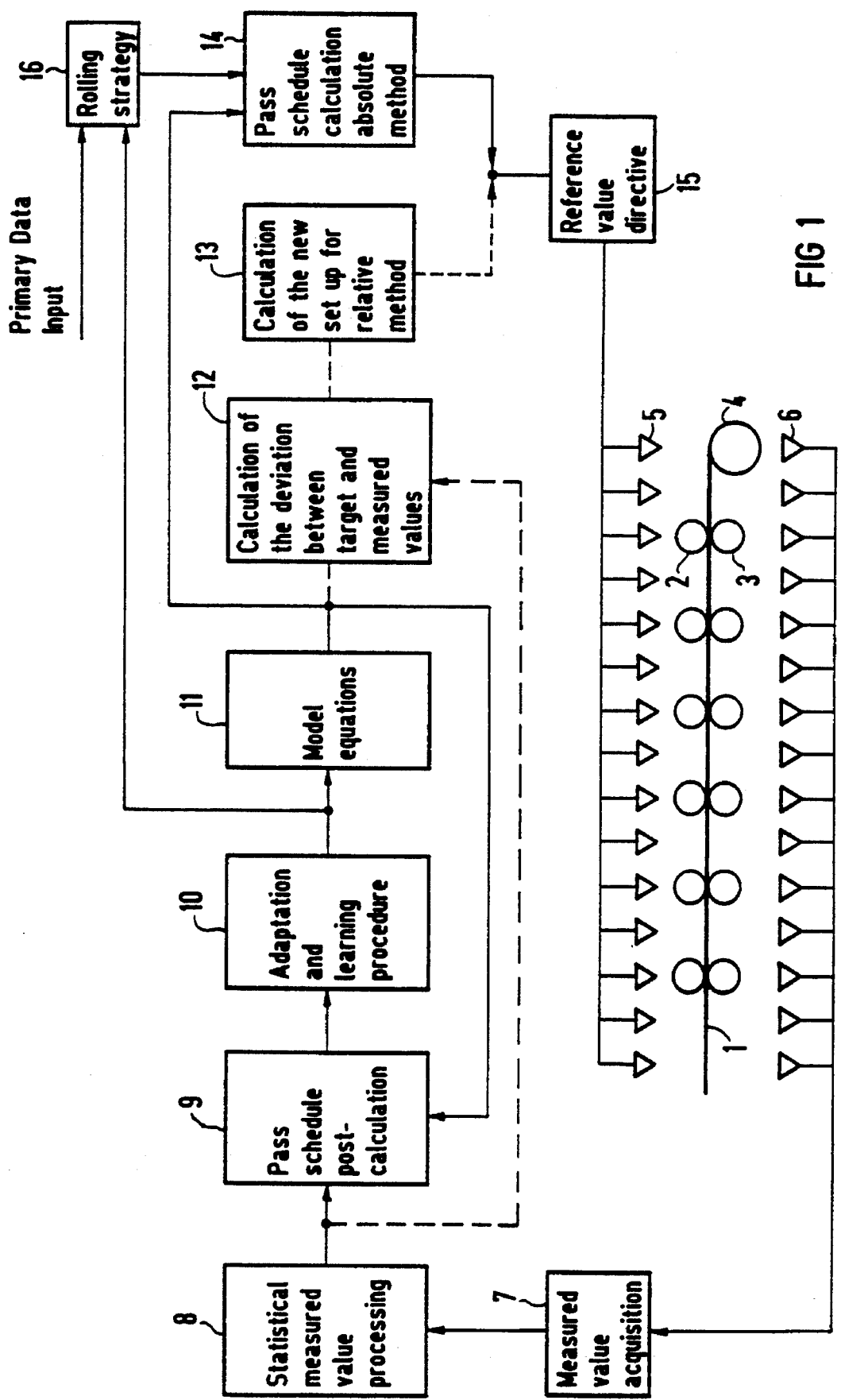
FIG. 1 illustrates a schematically depicted mill train and its control structure.

In FIG. 1, reference numerals 1 denotes the rolling stock, in particular a hot or cold strip, while numerals 2 and 3 denote the working rolls of a roll stand. The rolled product is wound on a winder 4. Measuring instruments 6 stand next to the mill train, for example next to the roll stands, or also between the stands. The individual control units 5, act on the various stand driving mechanisms, for example for the screw-down position [setting], the rotational speed, etc. At this point, the absolute control is as follows for the normal course of manufacturing, in accordance with the solid lines in FIG. 1.

The values from the instruments 6 initially undergo a measured-value adaptation 7; after that a statistical preparation and assessment or confidence interval (formerly known as a practical limit error) is calculated 8. The adapted and prepared measured values undergo a re-calculation 9. As a result of the re-calculation 9, the essential process variables, e.g., the final thickness, the final temperature, the decrease in thickness, the roll-stand force, the driving force, the relative decrease in thickness, etc., are calculated, thereby being optimized from a standpoint of control engineering. In accordance with the standard deviations of the prepared measured values, the amplification of the feedback circuits that have developed, is advantageously changed. The re-calculated values undergo a standard adaptation and learning procedure 10 and, after that, the setpoint values are calculated on the basis of model equations 11. The determined values are fed back to the re-calculation 9 in accordance with the above. This is a very important step, which enables the necessary adaptation and required learning steps to be carried out.

The primary data are input into the control system 16 and subsequently provided, together with the results from the model-equation calculation, to an absolute-value calculation 14. From this calculation, the new setpoint values for the individual control units 5 are then determined by way of the references value directive 15.

As a result of relative adaptation, which follows the broken lines, adaptation of the control system is accelerated in the event of changes in requirements, in that the values obtained from the measured-value adaptation 7 are merely subjected to a plausibility check in 8 and then directly fed to the calculation for the deviation between the values coming from the manual operation or from the preceding rolling process 12. Based on said deviation new set values are subsequently calculated in 13 for the first production process after the sudden change or jump caused by the changes in requirements. The new set values are added to the set point values from the absolute adaptation 14 and, after their conversion in 15, yield the new set values for the individual control units 5. These values are advantageously determined considerably faster in this relative adaptation.

Figure 2:
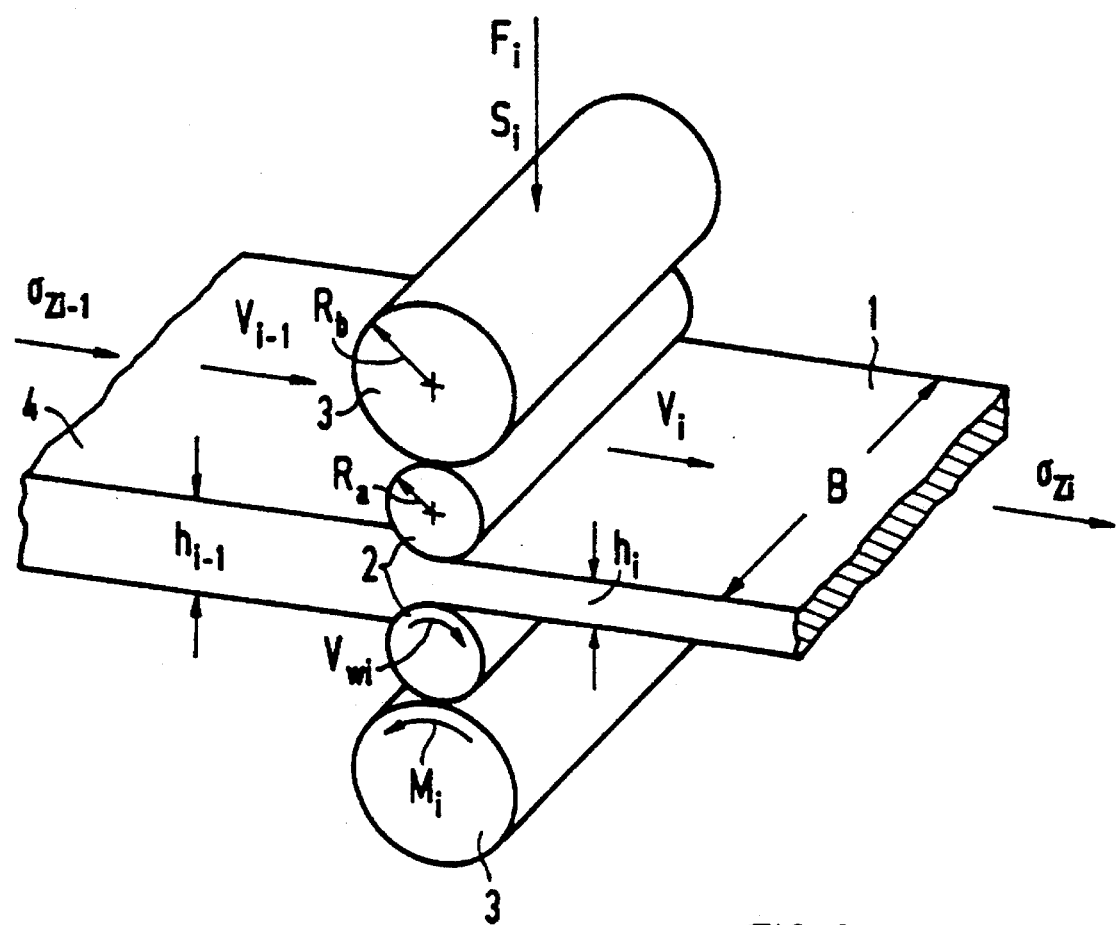
FIG. 2 illustrates a schematically depicted working- and backing-roll pair, including the specification of variables important to the control system from the standpoint of roll engineering.

In FIG. 2, the strip variables are denoted upstream from the stand by i−1 and downstream from the stand by i. Upstream, the strip velocity amounts to $V_{i-1}$ and the downstream velocity amounts to $V_i$. The variables and forces existing on the stand and the strip behave during passage through the stand as described in the following equations known, for example, from lectures and technical articles.

$$h_i \cdot V_i = h_{i-1} \cdot V_{i-1} \quad (1)$$

(volume constancy)

$$V_i = (1 + r_{vi}) \cdot V_{wi} \quad (2)$$

(forward slip)

$$S_i = h_i - C_i(B) \cdot F_i - \text{roll flattening } (F_i, h_i, h_{i-1}) - \text{bearing oil film thickness } (F_i, V_i) + r_{si} \quad (3)$$

(screwdown)

$$F_i = f(r_{fi}, K_f, B, h_{i-1}, h_i, T_i, Z_{i-1}, Z_i, V_i) \quad (4)$$

(roll separating force)

$$M_i = m(r_{mi}, K_f, B, h_{i-1}, h_i, T_i, Z_{i-1}, Z_i, V_i) \quad (5)$$

(rolling torque)

$$T_i = t(r_{ti}, T_{i-1}, M_{i-1}) \quad (6)$$

(heat losses (rolling time, transport time))
(initial pass temperature, deformation energy)

The individual equations yield the correlation of the individual variables, which are used in the adaptation equations.

In particular, the absolute and relative converging parameter adaptation proceeds from an initial equation of the type:

$$r_{si} = S_i - h_i + C_{Ri} F_i$$

$$r_{fi} = -a_{Ri} h_{i-1} + a_{Ri} h_i + F_i,$$

where r represents the parameters.

The absolute and relative converging parameter adaptation is then continued with equations of the type:

$$\hat{r}_{si} = \frac{1}{1 + sT_1} r_{si}$$

$$\hat{r}_{fi} = \frac{1}{1 + sT_2} r_{fi}$$

$\hat{r}$ representing the corrected parameters.
where r represents the corrected parameters.

Finally, the absolute and relative converging parameters adaptation is further continued with equations of the type:

$$\hat{r}_{si} = S_i - h_i^* + C_{Ri} F_i^*$$

$$\hat{r}_{fi} = -a_{Ri} h_{i-1} + a_{Ri} h_i^* + F_i^*,$$

so that the variable functional variables of the roll stands are determined from these equations.

As described above, in the event of changes in requirements, the two-step adaptation leads to a considerably faster adaptation of the individual control units 5 to the modified requirements. After changes in requirements are made, for the most part, the result of this two-step calculation is that the product manufactured in the next manufacturing operation already comes out within tolerances. This is a considerable advantage, which can be achieved through a simple program supplement, while applying the teaching in accordance with the present invention. The processing unit and the other components of the control system can advantageously remain unchanged. One cannot detect when the relative adaptation operations run down, since their values converge all the more on zero, the more the absolute adaptation supplies correct values.

Thus, the tolerances of a mill train can be considerably improved with existing devices and program parts, simply by supplementing the program. The advantages are especially critical, when the aim is to achieve a JUST-IN-TIME production for purposes of stocking a small amount of spare parts, where changes in requirements come up often.

The invention has been developed for a strip-rolling process. It is understood, however, that its advantages are also achieved for other correspondingly structured control systems, such as for tube rolls, shaped rolls, etc.

What is claimed is:

1. A feedback control of a rolling process that includes control units for controlling individual roll stands of a rolling mill, said control units having setpoint values determined using model equations whose model-equation parameters are varied in dependence on measured values of process variables to adapt the model equations to an actual course of the rolling process, wherein, in the event of changes in requirements of the rolling process, deviations between said measured values of said process variables and values coming from a preceding rolling process are calculated, set values are calculated based on said deviations with the aid of the model equations and said setpoint values for said control units are supplemented by said calculated set values.

2. The feedback control according to claim 1, whereby said set values are added to said setpoint values.

3. The feedback control according to claim 1, whereby said setpoint values are supplemented by said set values in the event of a transition from a manual to an automatic operation.

4. The feedback control according to claim 1, whereby said setpoint values are supplemented by said set values when there are changes in a final thickness.

5. The feedback control according to claim 1, whereby said setpoint values are supplemented by said set values when there are changes in temperature.

* * * * *